United States Patent [19]

Vock et al.

[11] Patent Number: 4,500,770

[45] Date of Patent: Feb. 19, 1985

[54] APPARATUS FOR MAKING PERFORATIONS IN RUNNING WEBS OF PAPER OR THE LIKE

[75] Inventors: Jürgen Vock, Hamburg; Peter Pinck, Gross-Hansdorf; Norbert Lange, Glinde; Erwin Schmalfeld, Reinbek; Kurt-Eckard Petersen, Wentorf, all of Fed. Rep. of Germany

[73] Assignee: Hauni-Werke Körber & Co. KG, Hamburg, Fed. Rep. of Germany

[21] Appl. No.: 391,478

[22] Filed: Jun. 23, 1982

[30] Foreign Application Priority Data

Jul. 10, 1981 [DE] Fed. Rep. of Germany ....... 3127206

[51] Int. Cl.³ .............................................. B23K 27/00
[52] U.S. Cl. ............................... 219/121 LK; 131/281
[58] Field of Search .................. 219/121 LK, 121 LL, 219/384; 131/281

[56] References Cited

U.S. PATENT DOCUMENTS

| | | | |
|---|---|---|---|
| 4,121,595 | 10/1978 | Heitmann et al. | 219/121 LK X |
| 4,236,062 | 11/1980 | Lilly, Jr. et al. | 131/281 X |
| 4,247,687 | 1/1981 | Baier | 219/384 |
| 4,281,670 | 8/1981 | Heitmann et al. | 131/281 |

FOREIGN PATENT DOCUMENTS

| | | |
|---|---|---|
| 2754104 | 6/1979 | Fed. Rep. of Germany . |
| 2934044 | 3/1981 | Fed. Rep. of Germany . |
| 3114603 | 1/1982 | Fed. Rep. of Germany . |
| 2064399 | 7/1981 | United Kingdom . |

*Primary Examiner*—C. L. Albritton
*Attorney, Agent, or Firm*—Peter K. Kontler

[57] ABSTRACT

Apparatus for making perforations in continuous or interrupted webs of cigarette paper or the like has one or more perforating units serving to direct radiant or electrical energy against selected portions of the web to make holes therein. That portion of each perforating unit which surrounds the locus of propagation of energy beyond the respective perforating unit is externally cooled and cleaned by one or more streams of compressed gas which ensure that such portion cannot accumulate solid combustion products which could interfere with the propagation of energy toward the web. The stream or streams are furnished by the orifices of nozzles which can be provided in the carrier or carriers for the perforating units or can be outwardly adjacent to the carrier or carriers.

26 Claims, 4 Drawing Figures

APPARATUS FOR MAKING PERFORATIONS IN RUNNING WEBS OF PAPER OR THE LIKE

BACKGROUND OF THE INVENTION

The present invention relates to apparatus for making perforations in flexible webs, sheets, strips, tapes or like materials, for example, in wrapping materials for fillers consisting of natural, substitute and/or reconstituted tobacco or of filter materials. More particularly, the invention relates to improvements in apparatus for making perforations in running webs, strips or like bodies (hereinafter called webs for short) of flexible sheet or foil material, preferably a material which is used in the tobacco processing industries to constitute wrappers for tobacco, filter material or both. Still more particularly, the invention relates to improvements in apparatus for making perforations by resort to devices for directing radiant or other energy against selected portions of a running web so as to provide therein one or more annuli, rows or files of perforations in the form of round and/or otherwise configured holes.

It is known to provide the wrappers of smokers' products, such as plain or filter tipped cigarettes, cigars or cigarillos, with perforations which serve to admit atmospheric air into the column of tobacco smoke. The relatively cool atmospheric air is believed to beneficially influence the quantity of nicotine and condensate in the tobacco smoke. For example, if the smokers' products are filter cigarettes, the perforations are normally provided in that portion of the tubular envelope of the filter plug which is adjacent to the tobacco-containing portion of the cigarette. The perforations can be made in the wrapping material prior to draping around tobacco fillers and/or filter material, or in the tubular envelopes of finished smokers' products.

In accordance with a known proposal, the source of energy is a laser which is installed and whose beam is deflected and/or otherwise influenced in a manner as disclosed, for example, in German Offenlegungsschrift No. 2,754,104. It has been found that coherent radiation which is emitted by a laser can provide a sheet-like material with zones of highly predictable permeability irrespective of whether the perforations are made in the wrappers of finished or semifinished smokers' products or in the running web or webs which are thereupon converted into wrappers of plain or filter cigarettes or the like.

Another known mode of making perforations in the envelopes or wrappers of rod-shaped smokers' products is by resort to an electroperforating apparatus wherein the web is guided through one or more gaps defined by one or more pairs of electrodes having different polarities. The electrodes are connected to an energy source which causes sparks to jump across the gaps between the pairs of associated electrodes with the resultant formation of perforations in those web portions which happen to be located in the gap or gaps. Reference may be had to commonly owned German Offenlegungsschrift No. 2,934,044.

A drawback of the above described conventional perforating apparatus is that solid combustion products which develop as a result of making perforations in a web of paper, cardboard, imitation cork or the like are likely to interfere with the operation of such apparatus, and more particularly to prevent the making of perforations having a predictable size and/or shape so that the permeability of the ultimate product deviates from an optimum permeability. As a rule, the combustion products (this term is intended to embrace fully combusted solid remnants of the material which is removed to make perforations as well as partially combusted fragments of foil, cardboard, paper or the like) will float around the perforating station or stations and will tend to deposit at the outlet or outlets of the device or devices which discharge beams of coherent radiation or on the electrodes of an electroperforating apparatus. Commonly owned copending German patent application Ser. No. P 31 14 603.1 discloses a perforating apparatus which is designed to maintain the solid combustion products away from the locus of impingement of beams of coherent radiation upon a running web of cigarette paper or the like. This is achieved by providing means for directing streams of air through the radiation directing device or devices so as to ensure that any particles which are removed from the running web as a result of impingement of one or more beams of coherent radiation will be blown away from the radiation-directing means as well as away from the perforating station or stations proper, i.e., away from the locus or loci of impingement of coherent radiation upon the running web. If the web is perforated during travel through one or more gaps between one or more pairs of electrodes, the apparatus can be equipped with means for establishing and maintaining streams of air which flow transversely of the electrodes and in the direction of movement of the running web in order to entrain the solid combustion products away from the gap or gaps. Reference may be had to the aforementioned German Offenlegungsschrift No. 2,934,044.

It has been found that the aforediscussed undertakings do not suffice to effect, and cannot guarantee, the removal of all solid combustion products which develop, for example, when a running web is subjected to the perforating action of pairs of electrodes and/or one or more beams of coherent radiation. More particularly, the aforediscussed stream or streams of air cannot prevent the accumulation of solid particles at the radiation discharging ends or outlets of orifices in nozzles or analogous devices which direct coherent radiation against a running paper web or the like. Such solid matter is likely to accumulate around the discharge ends of the nozzles and to gradually occlude the path for coherent radiation so that the perforating action of the apparatus is adversely influenced and the permeability of the treated web deviates from an optimum permeability. The accumulations of solid combustion products are particularly bothersome when the web which is to be perforated is in motion, i.e., when the perforations are to be made in a running web of cigarette paper, imitation cork or the like. In such apparatus, the solid combustion products have a component of movement in the direction of advancement of the running web and are highly likely to accumulate at the downstream sides of the radiation-directing devices, and more particularly at the downstream sides of the discharge ends of such devices to form nose-like projections rings or otherwise configured accumulations which interfere with the propagation of beams of coherent radiation against the running web. The accumulations rapidly assume proportions which block substantial portions of orifices for the beams of coherent radiation so that, if the operation of the apparatus is to remain satisfactory, the radiation-directing devices must be inspected, cleaned or replaced at frequent intervals. This is a cumbersome and time-consuming procedure which is particularly undesirable in a modern filter tipping, filter rod making, cigarette rod making or an analogous mass-producing machine wherein each, even very short, interval of idleness entails extremely high losses in cigarettes, filter rod sections or like rod-shaped smokers' products or component parts of smokers' products. Furthermore, the apparatus which makes perforations in a running web of cigarette paper or the like, or in the wrappers of successive rod-shaped smokers' products, is not always readily accessible so that its inspection, cleaning and/or repair often necessitates at least partial dismantling of other constituents of a mass-producing filter tipping, filter rod making or analogous machine.

OBJECTS AND SUMMARY OF THE INVENTION

An object of the invention is to provide a perforating apparatus wherein all solid products of combustion are reliably removed from the regions where they could interfere with the making of satisfactory perforations in a simple and inexpensive manner.

Another object of the invention is to provide a novel and improved method of removing solid impurities from the region or regions where a web or successive portions of a web are formed with one or more rows or annuli of perforations.

A further object of the invention is to provide an apparatus wherein the solid products of combustion cannot interfere with the propagation of radiant or other energy during the making of perforations with assistance from or by resorting to beams of coherent radiation, electric sparks or the like.

An additional object of the invention is to provide the perforating apparatus with novel and improved means for preventing accumulations of solid combustion products on the housings of perforating units.

Another object of the invention is to provide an apparatus which can stand long periods of uninterrupted use without any deterioration or without appreciable deterioration of the quality of perforations which are formed in a running web or in discrete sections of a web of cigarette paper, imitation cork or a like flexible wrapping material.

An additional object of the invention is to provide novel and improved means for preventing the development of ring-shaped, nose-like, tongue-like or otherwise configurated accumulations or agglomerations of solid combustion products in perforating apparatus which operate with coherent radiation or in electroperforating apparatus.

Still another object of the invention is to provide a perforating apparatus which can be readily installed in or combined with existing tobacco processing or like machines as a superior substitute for heretofore known perforating apparatus.

A further object of the invention is to provide the perforating apparatus with novel and improved means for effecting a reliable and long-lasting self-cleaning action by expelling from the apparatus all traces, or at least the majority, of solid combustion products.

An ancillary object of the invention is to provide the apparatus with novel and improved means for supporting one or more perforating units in the form of nozzles for the passage of coherent radiation and/or in the form of electrodes which define spark gaps wherein the material of a cigarette paper web or the like is formed with perforations of desired size and/or shape.

Another object of the invention is to provide the apparatus with novel and improved means for reliably guiding the material which is to be perforated and with novel and improved means for preventing accumulations of solid combustion products at the discharge ends of perforating units which operate with laser beams or at the exposed free ends of electrodes in an electroperforating apparatus.

A further object of the invention is to provide a novel and improved method of evacuating from a filter tipping or analogous machine solid combustion products which develop in the course of perforating a running web or successive sections of a running web of cigarette paper or the like.

The invention is embodied in an apparatus for perforating sheet-like material, particularly for making holes in a moving wrapping material for rod-shaped articles of the tobacco processing industry. The apparatus comprises at least one energy-directing perforating unit which is spaced apart from the material to be perforated and has a portion beyond which energy which is used to make perforations propagates itself toward and against the material with attendant separation of solid matter (such as partially or completely combusted portions of paper, imitation cork or the like) in the regions of impingement of energy against the material, and means for conveying at least one stream of a gaseous fluid against the exterior of the aforementioned portion of the perforating unit to thus reduce the likelihood of accumulations of solid matter thereon. The apparatus preferably further comprises advancing means (such as driven rollers, suction drums or the like) for transporting the material during impingement of energy thereon so that the material is formed with at least one row of perforations extending in the direction of advancement of the material.

The aforementioned portion is preferably a marginal portion (particularly an annular rim) of the perforating unit.

The gaseous fluid can be supplied by a suitable source and the conveying means then comprises means for receiving gaseous fluid from such source.

The aforementioned portion of the perforating unit can have an annular or uninterrupted end face and the rim then surrounds such end face. The conveying means directs one or more streams of gaseous fluid against the entire rim or against one or more selected sections of the rim, particularly against that section or those sections which face in the direction of advancement of the material because such section or sections are most likely or highly likely to accumulate solid combustion products when the perforating apparatus is in actual use. The conveying means can comprise one or more nozzles having orifices which receive compressed gaseous fluid from the source and direct the thus received fluid against one or more selected sections of the rim of the perforating unit.

The energy can be radiant energy which is furnished by a laser or another suitable source of coherent radiation. The perforating unit is then preferably provided with a passage for the propagation of radiant energy therethrough and on toward the path of movement of the material to be perforated. The aforementioned portion or rim of the perforating unit preferably surrounds the outlet of the passage and is cooled as well as cleaned by one or more streams of gaseous fluid which is supplied by one or more orifices. As mentioned above, the nozzle or nozzles discharge compressed gas which preferably cools and cleans (or maintains clean) that section or those sections of the rim which face in the direction of advancement of the material to be perforated. If desired or necessary, the conveying means can comprise two or more nozzles or an annular nozzle for directing gaseous fluid against several sections of or against the entire rim of the perforating unit.

The perforating unit can be installed in a carrier or another suitable support in such a way that its aforementioned portion remains exposed. The carrier has a surface which is spaced apart from the path of advancement of the material to be perforated and beyond which the aforementioned portion of the perforating unit extends so as to be accessible to the stream or streams of gaseous fluid issuing from the orifice or orifices of the conveying means. The latter can comprise one or more nozzles which are installed in or on, or which can constitute integral parts of, the carrier. The means for feeding gaseous fluid from the source of pressurized gas to the nozzle or nozzles can comprise one or more channels, bores, holes, grooves or like passages provided in the carrier. The carrier and the material which advances along its path preferably define a chamber which is traversed by the energy propagating itself beyond the rim of the perforating unit and toward the path of the material. The apparatus preferably further comprises means for circulating a gaseous fluid (e.g., atmospheric air) in the just mentioned chamber so as to remove solid matter therefrom. The circulating means preferably includes means for directing the stream of air or the like substantially transversely of the direction of advancement of the material along its path.

Still further, the apparatus can comprise suitable guide means which defines the path for the material to be perforated. The aforementioned chamber can be defined by the guide means (e.g., by a shroud which has openings for propagation of energy against the material) and by the exposed surface of the carrier.

The perforating unit can comprise a tubular housing which includes the aforementioned portion or rim and has an inlet for energy, an outlet for energy and a passage connecting the inlet with the outlet. The rim surrounds the outlet of the housing. The housing preferably contains an optical element which is installed in its passage and serves to focus radiant energy upon the material in the path. A beam of such radiant energy can be directed from a laser or another suitable source by one or more partially or fully reflecting mirrors or analogous optical means. Furthermore, the apparatus can comprise means for admitting compressed gaseous coolant into the interior of the housing. Such coolant may be the gaseous fluid which is used to prevent accumulations of solid matter on the rim of the housing.

The aforementioned carrier can support two or more perforating units each of which is designed to form a row of perforations in the advancing material. The aforementioned portion of each such perforating unit extends beyond the carrier and toward the path of the material, such as a running web of cigarette paper or imitation cork which is normally used in a filter tipping machine for the making of adhesive-coated uniting bands which connect filter plugs with plain cigarettes, cigars or cigarillos. The means for splitting a single incoming beam of radiant energy into two or more beams, one for each perforating unit, can be installed in part externally of and in part in the interior of the carrier for two or more perforating units. In other words, each perforating unit can receive a share of a single beam of coherent radiation which is supplied by a laser or the like.

If the perforating apparatus comprises two or more perforating units, such units may but need not be installed in a common carrier or support. As mentioned above, each perforating unit can be designed to make a discrete row of perforations in a running web of wrapping material or in a tubular wrapper forming part of a cigarette which is treated while rotating about its own axis.

The guide means which defines the path for a moving web of cigarette paper or like wrapping material can include at least one discrete component for each perforating unit, and such discrete components are preferably closely or immediately adjacent to the locations of impingement of beams or sparks of energy supplied by the respective perforating units. This ensures accurate guidance of those portions of the web which are being perforated. The aforementioned component or components of the guide means may constitute or include parallel guide pins which extend at right angles to the longitudinal direction of the web, i.e., they extend substantially transversely of the direction of advancement of the material to be perforated past the perforating unit or units. The guide pins can define an arcuate path whose convex side preferably faces the perforating unit or units. The path can be disposed between the guide means and the carrier for one or more perforating units. Alternatively, the guide means can be disposed between the path and the carrier; in such instances, the guide means can include an arcuate shroud whose concave side faces the rims of the perforating units.

The apparatus can further comprise means for circulating a gaseous fluid (e.g., atmospheric air) along that side of the material which faces away from the perforating unit or units. For example, the apparatus can comprise a cover which is spaced apart from one side of the material, namely, from that side which faces away from the perforating unit or units. A suction generating device or other suitable means can induce the flow of a current of air between the cover and the material, preferably in a direction at least substantially transversely of the longitudinal direction of the path, i.e., substantially transversely of the direction of advancement of a continuous web of cigarette paper or the like along its path.

As mentioned above, if the material to be perforated is a tubular wrapper which is already applied to a rod-shaped smokers' product, the latter is preferably rotated about its own axis while the perforating unit or units direct one or more beams of radiant or other energy against the rotating wrapper. This provides the wrapper with one or more annuli of perforations. The means for rotating the wrapper about its own axis can comprise a rotary conveyor which supports the respective product and a drum or a like rolling device which cooperates with the rotary conveyor to roll the product along the periphery of the rotary conveyor so that the progress of the product is temporarily arrested, namely, during the interval of impingement of radiant or other energy.

The perforating unit can include an electrode, and the apparatus then further comprises means for supplying electrical energy to the electrode. The electrode has an end face or a tip which is adjacent to the material to be perforated and the aforementioned portion of the perforating unit then constitutes a rim which surrounds the end face of the electrode. Such apparatus can comprise at least one additional electrode which defines with the first mentioned electrode a spark gap wherein the material to be perforated by sparks is advanced by rollers, pulleys, suction drums or the like. The conveying means then comprises means for directing streams of a gaseous fluid against the rims of both electrodes. The electrodes can be installed in suitable insulator means which can be said to constitute carrier means for the perforating units and can be provided with nozzles forming part of the conveying means for gaseous fluid. A common source of compressed gaseous fluid can be provided for the entire conveying means which then further includes means for feeding compressed gaseous fluid from the source to the respective nozzle or nozzles.

The perforating unit or units, the carrier means therefor, and the conveying means can be installed in a filter tipping or other machine for the processing of tobacco and/or filter material.

The novel features which are considered as characteristic of the invention are set forth in particular in the appended claims. The improved perforating apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a fragmentary longitudinal vertical sectional view of an electroperforating apparatus which makes one or more rows of holes in a running web of paper or the like.

DESCRIPTION OF THE PREFERRED EMBODIMENTS

Figure 1:
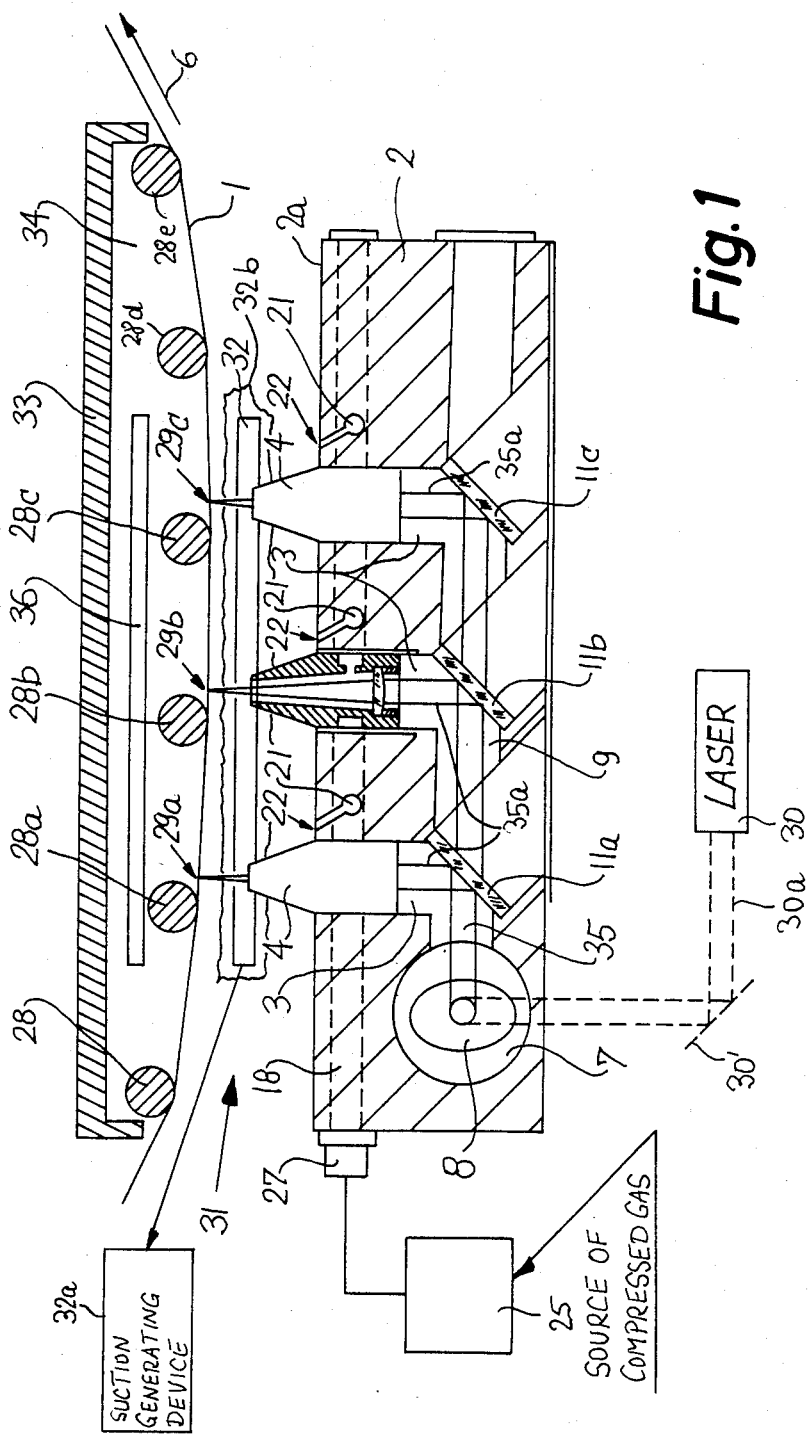
FIG. 1 is a partly schematic fragmentary longitudinal vertical sectional view of a perforating apparatus which embodies one form of the invention and is used to make several rows of perforations in a running web of cigarette paper or the like by resorting to laser beams.
Figure 2:
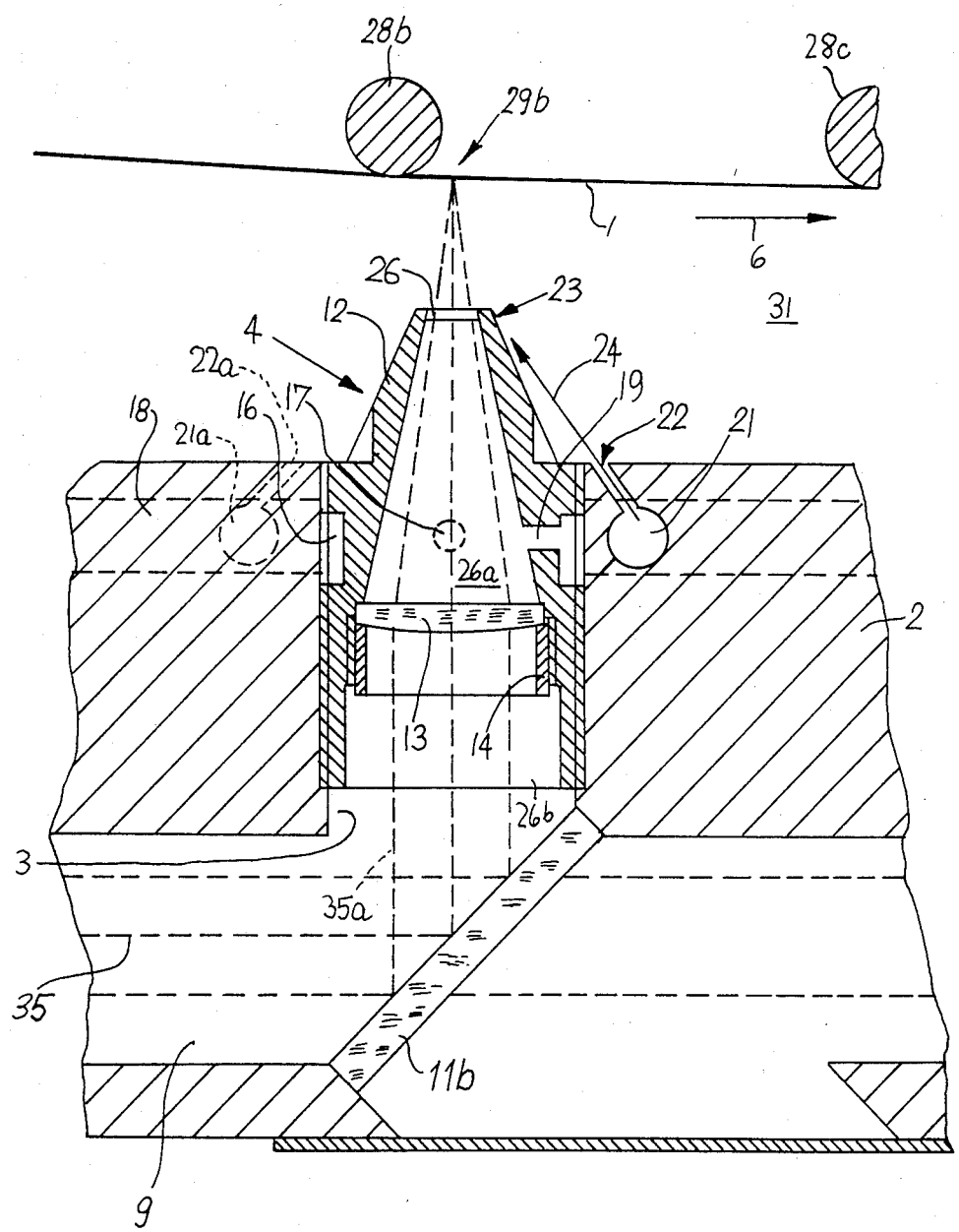
FIG. 2 is an enlarged view of a detail in the apparatus which is shown in FIG. 1.

The perforating apparatus which is shown in FIGS. 1 and 2 is installed in a filter tipping machine, e.g., a machine of the type known as MAX-S produced by the assignee of the present application. Reference may be had to commonly owned U.S. Pat. No. 4,281,670 granted Aug. 4, 1981 to Uwe Heitmann et al. The disclosure of the patent to Heitmann et al. is incorporated herein by reference. The perforating apparatus makes several rows of perforations in a running web 1 of so-called tipping paper which is advanced (by transporting means of the type disclosed in the patent to Heitmann et al.) in the direction indicated by arrow 6 and whose leader is severed at regular intervals so that the web 1 yields a succession of discrete uniting bands which are convoluted around groups of coaxial rodshaped articles, preferably around groups each of which comprises a filter plug of double unit length and two filter cigarettes of unit length. Each uniting band converts the respective group into a filter cigarette of double unit length which is thereupon severed midway across its filter plug to yield two coaxial filter cigarettes of unit length. Such filter cigarettes of unit length are thereupon processed in a manner as fully disclosed in the patent to Heitmann et al.

The apparatus which is shown in FIGS. 1 and 2 resembles the perforating apparatus which is disclosed in commonly owned copending application Ser. No. 294,815 filed Aug. 20, 1981 by Peter Pinck et al. for "Apparatus for perforating webs of wrapping material for tobacco or the like". Reference may be had to the application of Pinck et al. for all such details which are not shown in the drawing of the present application because they form no part of the present invention. Reference may further be had to the aforementioned commonly owned copending German patent application Ser. No. P 31 14 603.1.

Referring now in greater detail to the perforating apparatus which is shown in FIGS. 1 and 2, this apparatus comprises a carrier or support 2 which has bores or sockets 3 for discrete perforating units or heads 4. The perforating units 4 are staggered with reference to each other, as considered transversely of the longitudinal direction of the running web 1, so that each thereof makes in the web one of three parallel rows of perforations when the apparatus is in actual use. If necessary, and as shown in FIG. 2 of the copending application Ser. No. 294,815 of Pinck et al., the apparatus can comprise two sets of perforating units 4, and each such set can comprise two or more perforating units which are staggered with reference to one another in order to make two sets of rows of perforations. This is desirable when the filter tipping machine wherein the improved perforating apparatus is put to use is designed to make filter cigarettes of double unit length which are thereupon converted into filter cigarettes of unit length. Such conversion involves subdividing each convoluted uniting band into two equal halves each of which is provided with two or more annuli of perforations serving to admit cool atmospheric air into the column of tobacco smoke which flows through the filter mouthpiece and into the mouth of the smoker. As a rule, and as shown in FIG. 2 of the copending application of Pinck et al., the rows of perforations in each set of rows are closely or immediately adjacent to one another.

The carrier 2 is further formed with a tunnel or bore 7 for entry of a first or main beam 30a of coherent radiation which is furnished by a pulsed laser 30 and is reflected by a fully reflecting mirror 30' indicated by broken lines. The main beam 30a is split into three beams 35a subsequent to renewed reflection by a mirror 8 in the interior of the tunnel 7. The twice reflected main beam 30a is denoted by the reference character 35. This beam impinges first upon a partly reflecting mirror 11a which permits two-thirds of the beam 35 to pass therethrough but reflects one-third (first split beam 35a) of the beam 35 into the first or foremost socket 3 (namely, into the socket which is nearest to the tunnel 7). The remainder of the twice reflected main beam 35 passes in part through a second partly reflecting mirror 11b so that it yields two additional split beams 35a which respectively enter the second and third sockets 3 of the carrier 2. The mirror 11c is of the fully-reflecting type and serves to direct the third split beam 35a into the respective socket 3, namely, into the rightmost socket, as viewed in FIG. 1. The mirrors 11a, 11b and 11c are installed in a second tunnel or bore 9 which communicates with the tunnel 7 in the interior of the carrier 2 and extends substantially at right angles to the direction of propagation of the once-reflected main beam 30a. The arrangement is preferably such that the intensity of each of the three split beams 35a matches one-third of the intensity of the main beam 35.

If the main beam 35 is to be split into six beams 35a, i.e., if the apparatus comprises two sets of three perforating units 4 each, the tunnel 7 communicates with two parallel tunnels 9 and contains two mirrors 8 (namely, a partly reflecting and a fully reflecting mirror), one for each of the tunnels 9. The mirrors 8 split the once-reflected main beam 30a into two beams 35, and each such beam 35 is thereupon split into three beams 35a in a manner as shown in FIG. 1. All this is fully described and shown in the aforementioned copending application Ser. No. 294,815 of Pinck et al. The first of the two mirrors 8 in the tunnel 7 is then designed to reflect one-half and to permit the passage of the other half of the incoming once-reflected main beam 30a, and the second or rear mirror 8 is of the totally reflecting type.

FIG. 2 illustrates certain important details of one of the perforating units 4, namely, of the second or median perforating unit receiving a split beam 35a which is reflected by the partially reflecting mirror 11b in the tunnel 9. The perforating unit 4 of FIG. 2 comprises a hollow tubular housing 12 (which may constitute a separately manufactured component or an integral part of the carrier 2) which is inserted into the respective socket 3 of the carrier 2 and contains an optical element 13 in the form of a collector lens. The ring-shaped mount 14 of the lens 13 is provided with external threads mating with internal threads of the housing 12. The lens 13 can be stated to constitute the radiation-admitting window of the perforating unit 4. The external surface of the housing 12 is formed with a preferably circumferentially complete groove 16 which communicates with a longitudinally extending channel or bore 18 of the carrier 2 by way of a bore 17 machined into the carrier 2 and extending radially of the housing 12. The latter has a radial bore 19 which establishes communication between the groove 16 and the passage 26a of the housing 12. This passage has an inlet 26b for admission of the respective split beam 35a and a discharge end or outlet 26 beyond which the beam 35a propagates itself toward the running web 1.

In accordance with a feature of the invention, the channel 18 further communicates with a bore 21 which, in turn, communicates with an orifice 22 serving to discharge a stream of compressed gaseous fluid (e.g., air or a protective gas) in the direction of arrow 24, namely, toward that annular portion or rim 23 of the housing 12 which discharges the respective split beam 35a in a direction toward the running web 1. The rim 23 surrounds the discharge end or outlet 26 of the passage 26a which is defined by the housing 12 for the split beam 35a. That portion of the carrier 2 which surrounds the orifice 22 can be said to constitute a nozzle which is oriented to direct a stream of gaseous fluid toward that side or section of the rim 23 which faces forwardly, namely, in the direction indicated by the arrow 6. The intake end of the channel 18 receives compressed gaseous fluid from a suitable source 25 through a nipple 27 which is secured to or forms part of the carrier 2.

While FIG. 1 merely shows a single orifice 22 for each of the three perforating units 4, it is equally within the spirit of the invention to form the carrier 2 with two or more orifices for each of the perforating units 4. FIG. 2 shows, by way of example, a second orifice 22a which is indicated by broken lines and is disposed diametrically opposite the orifice 22 (with reference to the axis of the housing 12). The orifice 22a receives compressed gaseous fluid from the channel 18 through a bore 21a of the carrier 2. Three or more orifices 22, 22a, etc. can form an annulus around each of the housings 12 in order to direct streams of compressed gaseous fluid against all or nearly all sections of the respective rim 23. It is further within the spirit of the invention to provide an annular orifice all the way around the respective housing 12 to replace two or more discrete orifices 22, 22a, etc. Still further, the annular orifice may be interrupted, i.e., it may consist of two, three or more arcuate orifices which, in their totality, constitute an equivalent of an uninterrupted or circumferentially complete annular orifice. Such modifications are not specifically shown in the drawing because they can be readily visualized upon perusal of the preceding description and with reference to FIGS. 1 and 2 of the drawing.

The means for guiding the web 1 during travel in the direction of arrow 6 comprises a series of parallel guide pins 28, 28a, 28b, 28c, 28d, 28e extending transversely of the running web and mounted in the frame of the filter tipping machine. The guide pins 28-28e contact that side of the running web 1 which faces away from the housings 12 of the perforating units 4 and from the upper side or surface 2a of the carrier 2. It will be noted that the guide pins 28a, 28b, 28c are immediately or closely adjacent to the loci (29a, 29b, 29c) of impingement of the three split beams 35a upon the running web 1. The guide pins 28 to 28e together define an arcuate path for the web 1, and the convex side of such path faces the perforating units 4 in and the side or surface 2a of the carrier 2. This ensures that the web 1 is properly guided during travel of its increments past the composite perforating station including the loci 29a to 29c, i.e., the web 1 is not likely to perform any stray movements so that the three rows of perforations in the web are always disposed at a predictable distance from one another and from the marginal portions of the web.

Figure 3:
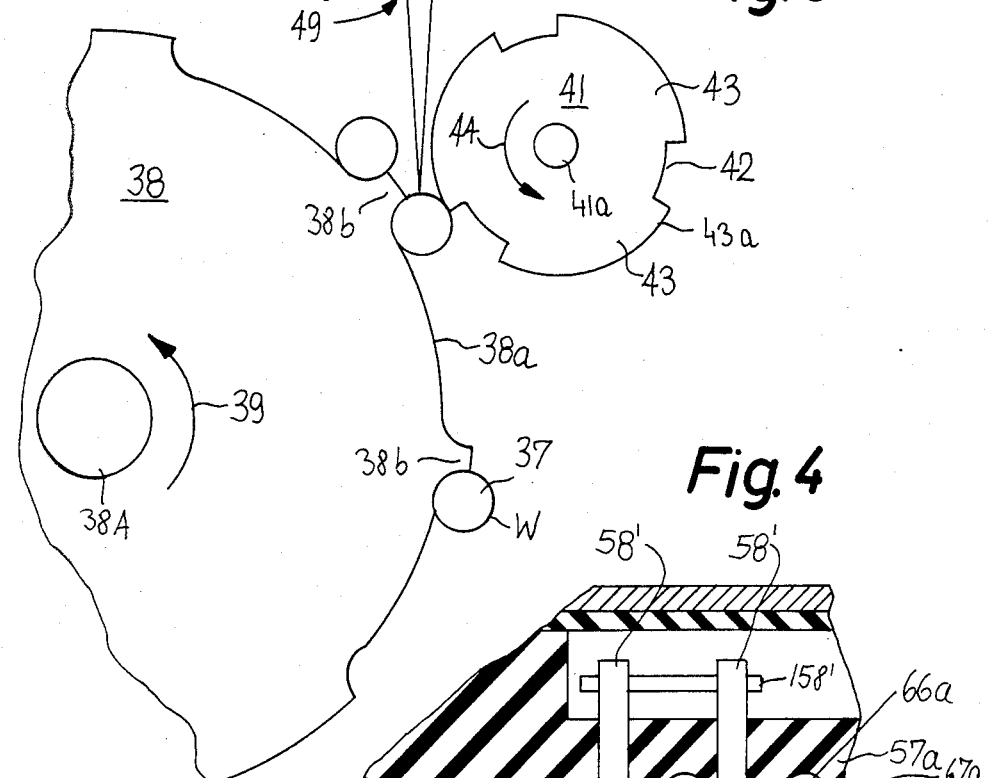
FIG. 3 is a fragmentary elevational view of a second perforating apparatus which is used to make perforations in the wrappers of rod-shaped smokers' products.
Figure 4:
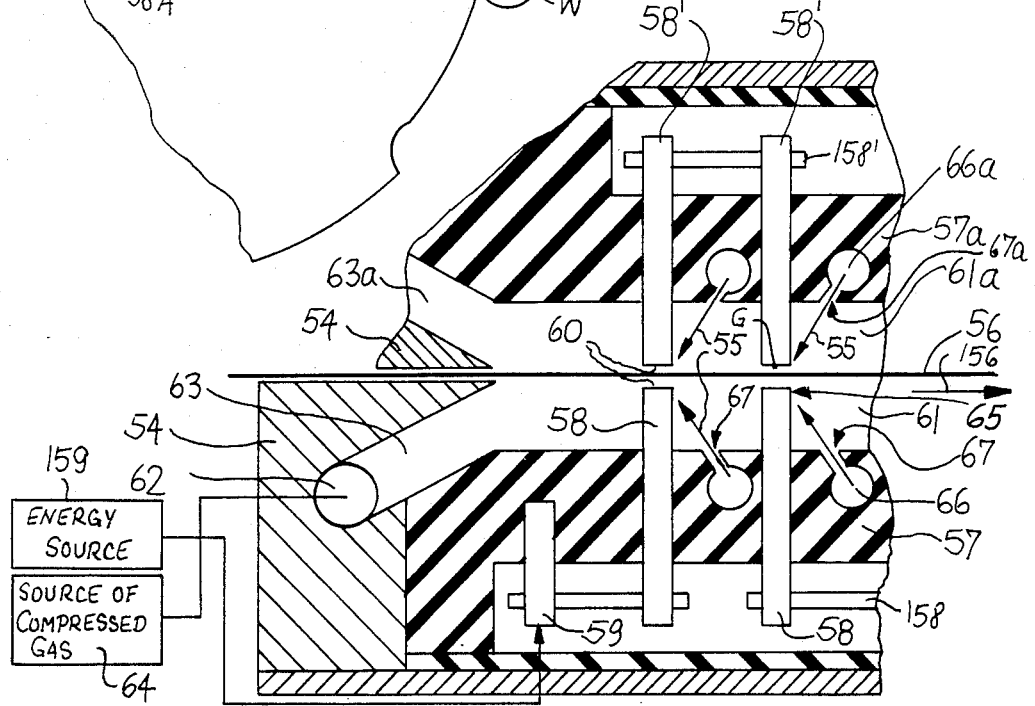

It is equally within the purview of the invention to dispose the guide pins 28 to 28e (or analogous guide means) at that side of the running web 1 which faces the perforating units 4 and the carrier 2. In such modified apparatus, the guide pins preferably define an arcuate path whose concave side faces the perforating units 4. Reference may be had to FIGS. 3, 4 and 5 of the copending application Ser. No. 294,815 of Pinck et al. If the guide pins are disposed between the web 1 and the perforating units 4, at least one pin is preferably immediately or closely adjacent to each of the locations where the split beams 35a impinge upon the running web 1. This ensures that the focal points of all optical elements 13 are invariably disposed in the path of movement of the web 1.

The web 1 and the carrier 2 define an elongated channel or chamber 31 for the flow of an air stream transversely of the direction (arrow 6) of lengthwise movement of the web 1. The means for causing a stream of air to flow transversely of the underside of the web 1 (as viewed in FIG. 1 or 2) comprises a suction generating device 32a which draws air from the chamber 31 by way of an elongated suction port or slot 32 machined into a frame member or wall 32b of the filter tipping machine.

The perforating apparatus of FIGS. 1 and 2 further comprises a cover or lid 33 which overlies the guide pins 28 to 28e at that side of the web 1 which faces away from the carrier 2 and perforating units 4. The web 1 and the cover 33 define a second channel or chamber 34 which is connected with the suction generating device 32a or with a discrete suction generating device (not shown) by way of an elongated suction port or slot 36 machined into a lateral wall of the cover 33 or into the aforementioned frame member or wall 32b of the filter tipping machine. The slot 36 causes an air stream to flow transversely of the running web 1 and to evacuate all solid combustion products which enter the chamber 34.

The operation of the perforating apparatus of FIGS. 1 and 2 is as follows:

The laser 30 (or another suitable source of coherent radiation) emits the main laser beam 30a which is totally reflected by the mirror 30' to enter the tunnel 7 and to impinge upon the totally reflecting mirror 8 which directs the twice reflected main beam (35) into the tunnel 9. The beam 35 is thereupon split by the mirrors 11a, 11b and reflected by the mirrors 11a, 11b, 11c so as to be converted or split into three discrete beams 35a each of which enters the axial passage 26a of the respective housing 12. It will be appreciated that the mirror 30' can constitute but one of two or more beam-reflecting optical elements which can be installed between the source 30 of coherent radiation and the inlet of the tunnel 7.

The optical elements 13 in the housings 12 of the perforating units 4 focus the respective split beams 35a upon the web 1 which travels along the path defined by the guide pins 18 to 18e, i.e., each of the beams 35a invariably impinges upon the web 1 at the respective locus 29a, 29b, 29c to thus form the web with three rows of perforations at predetermined distances from the marginal portions of the web. The laser 30 is pulsed so that each of the three rows preferably consists of discrete perforations of predetermined size and shape. As mentioned above, the making of three discrete rows of perforations is due to staggering of the perforating units 4 with reference to each other, as considered at right angles to the longitudinal direction of the web 1. The guide pins 28a, 28b, 28c invariably ensure that the loci 29a to 29c df impingement of split beams 35a upon the running web 1 are disposed in the path of movement of the web 1.

The channel 18 of the carrier 2 receives compressed gaseous fluid from the source 25 via nipple 27. Such fluid forms a stream which flows in the channel 18 and is divided into smaller streams flowing into the grooves 16 and thence into the bores 17 and passages 26a as well as into the bores 21 and thence into the respective orifices 22 and 22a. The streams which flow through the passages 26a of the housings 12 cool the respective perforating units 4, including their optical elements 13, and prevent solid combustion products (developing at the locations 29a, 29b and 29c) from penetrating into the respective housings 12 and contaminating the optical elements and/or interfering with the propagation of split beams 35a toward the path of the web 1. The streams which issue from the orifices 22 in the directions indicated by arrows 24 prevent accumulations of solid combustion products on the respective sections of the rims 23, i.e., around the respective outlets 26. Accumulations of solid combustion products on the rims 23 could result in partial or pronounced clogging of the passages 26a to thus interfere with the making of desirable perforations in the running web 1. In the absence of orifices 22 (and additional orifices, such as 22a, if they are provided in the carrier 2), the just discussed accumulations of solid combustion products could overlie parts of the respective outlets 26 with the aforediscussed undesirable consequences as concerns the quality and size of perforations in the web 1. The tendency of solid combustion products to accumulate at the downstream sides of the rims 23 (as considered in the direction indicated by the arrow 6) is attributable to the influence of running web 1 upon the direction of movement of solid combustion products in the chamber 31. Such tendency of solid combustion products to accumulate at the downstream sides of the rims 23 is effectively counteracted by the streams of compressed gaseous fluid which issue via corresponding orifices 22 and impinge upon the exposed portions of the housings 12 in the regions of the respective outlets 26. The particles which are blown away by streams or jets of gaseous fluid flowing in the directions indicated by arrows 24 are caused to enter the chamber 31 and are evacuated by the suction generating device 32a via slot 32. Any solid combustion products which enter the chamber 34 are evacuated via slot 36.

As mentioned above, the gas which is supplied by the source 25 may be air or a suitable protective gas.

An important advantage of the improved perforating apparatus is that it reliably removes from the filter tipping machine all or practically all traces of solid combustion products or, at the very least, all such solid combustion products which would be likely to accumulate or agglomerate into formations that could adversely affect the quality of operation of the perforating apparatus, i.e., the size and/or shape of perforations in the web 1. As stated above, this is accomplished by resort to the very simple and inexpensive expedient of directing one or more streams or jets of compressed gaseous fluid against the exterior of the exposed portion of the housing of each perforating unit 4, and more particularly against that portion of each housing 12 which is most likely to gather solid combustion products in quantities which could interfere with the propagation of coherent radiation toward the path of movement of the web 1. As also explained above, the orifices 22 and 22a are disposed externally of the perforating units 4, and at least the orifices 22 preferably direct streams or jets of compressed gas against those sections of the rims 23 which face in the direction (arrow 6) of forward movement of the web 1. This ensures reliable prevention of rapid accumulations of tongues, noses, annuli or other agglomerations of predominantly solid combustion products in or on those portions of the housings 12 which are most likely to permit the accumulations of foreign matter in quantities sufficing to interfere with the propagation of coherent radiation toward the path of the web 1. If at least one of the housings 12 is surrounded by a substantially annular (circumferentially complete or interrupted) orifice for directing compressed gas against the respective rim 23, such annular orifice preferably discharges a hollow cone-shaped stream or jet of compressed gas, preferably a hollow cone-shaped jet whose axis coincides with the axis of the passage 26a in the respective housing 12 and with the optical axis of the corresponding optical element 13. This ensures reliable prevention of accumulation of solid combustion products on any section of the respective rim 23 so that the corresponding perforating unit 4 can stand long periods of uninterrupted use. The same effect, or a similar effect, can be achieved if an annular orifice is replaced with a set of discrete orifices which together discharge a composite stream of gaseous fluid resembling a hollow cone. However, and as shown in FIGS. 1 and 2, it normally (or at least often) suffices if the number of orifices in the carrier 2 is such that, at the very least, each of the rims 23 is relieved of accumulations of solid combustion products in that part or section thereof which faces forwardly, as considered in the direction of advancement of the web 1.

As can be readily seen in FIGS. 1 and 2, those portions of the housings 12 which are in the path of streams or jets of compressed gaseous fluid issuing from the orifices 22a and/or 22 are disposed externally of the carrier or support 2. This renders it possible to simplify the construction of the apparatus in that the channel (18) which serves for admission of gaseous fluid into the interior of each housing 12 (in order to cool the housing and the respective optical element 13) can also supply compressed gaseous fluid to the orifices (22, 22a) for the formation of aforediscussed streams or jets which prevent the gathering of solid combustion products on the exposed portions of the housings 12. Furthermore, a single source (25) of compressed gaseous fluid and a single channel (18) can be used to supply gaseous fluid to a substantial number of orifices 22a and/or 22, e.g., to each of the orifices which are needed to rid two, three, four, six or more housings 12 of solid combustion products for extended periods of time.

It is clear that the means (32, 32a, 32b) for causing a stream of air to flow in the chamber 31 of FIG. 1 can be replaced by other air circulating or evacuating means without departing from the spirit of the invention. For example, the suction generating device 32a can be replaced with a source of compressed air or another gaseous fluid which blows air into the chamber 31 preferably at right angles to the direction of forward movement of the web 1. The same holds true for the means for causing a stream of air or another gas to flow in the chamber 34 between the cover 33 and the web 1.

FIG. 3 shows a portion of a modified perforating apparatus which is utilized to make one or more annuli (rows) of perforations in convoluted wrappers W of finished or partly finished rod-shaped smokers' products, e.g., in the wrappers of filter cigarettes 37 of unit length or multiple unit length. The apparatus which is shown in FIG. 3 is similar to those disclosed, for example, in the aforementioned U.S. Pat. No. 4,281,670 to Uwe Heitmann et al. Attention is invited to FIGS. 15 and 16 of this patent.

The cigarettes 37 whose wrappers W (each of which can be said to constitute a portion of a web which has been severed to yield a succession of discrete uniting bands) are to be formed with annuli (rows) of perforations are transported by a rotary drum-shaped conveyor 38 driven by its shaft 38A to rotate in the direction indicated by the arrow 39. The conveyor 38 has axially parallel peripheral ribs 38b flanking arcuate rolling surfaces 38a, and this conveyor cooperates with a rolling drum 41 whose shaft 41a is driven to rotate the drum in the direction of arrow 44. The drum 41 has three peripheral lobes 43 separated from each other by arcuate recesses 42. The convex surfaces 43a of the lobes 43 engage successive filter cigarettes 37 and cause each such cigarette to roll along the respective surface 38a from the preceding rib 38b to the next-following rib 38b. Such rolling movement suffices to ensure that each cigarette 37 performs at least one full revolution about its own axis during travel in the gap between the conveyor 38 and the rolling drum 41. The axes of the shafts 38A and 41a are parallel to each other. A cigarette 37 which is set in rotary motion in the gap between the drum 41 and the conveyor 38 (these components of the filter tipping machine rotate in the opposite directions) remains in the gap while in engagement with the respective convex surface 43a and begins to advance in the direction of arrow 39 only after it is engaged and entrained by the oncoming rib 38b of the conveyor 38. At such time, the cigarette 37 is adjacent to one of the three recesses 42 in the periphery of the rolling drum 41.

The perforating apparatus of FIG. 3 comprises a carrier 46 for at least one perforating unit 45. The optical element of this unit is shown at 45a, and the unit 45 receives a beam 47a of coherent radiation from a source 47, such as a suitable laser. The beam 47a is reflected by at least one mirror (note the mirror 47b) and passes through the optical element 45a which focuses the beam upon the wrapper W of the cigarette 37 rotating about its own axis in the gap between the conveyor 38 and the rolling drum 41. All details of the carrier 46 and perforating unit 45 are not shown in FIG. 3 because these parts may be identical with or analogous to the parts 2 and 4 of the perforating apparatus shown in FIGS. 1 and 2.

In accordance with a feature of the invention, the perforating apparatus of FIG. 3 further comprises means for directing or conveying one or more streams or jets of compressed gaseous fluid (such as air or a protective gas) against the rim 51 surrounding the outlet 49 of the passage in the housing of the perforating unit 45. The source of compressed gas is shown at 53, and this source admits compressed gas to a nozzle 48 via conduit means 52. The inclination of the nozzle 48 (and more particularly of the orifice which is defined by the nozzle 48) is such that the stream or jet of gaseous fluid is directed against that section of the rim 51 which is most likely to accumulate solid combustion products developing on impingement of the beam 47a upon the wrapper W of the cigarette 37 in the gap between the conveyor 38 and the rolling drum 41. If desired, the source 53 can supply compressed gas to two or more orifices. A second nozzle 48a is indicated in FIG. 3 by broken lines; this nozzle also receives compressed gas from the source 53 but it is equally possible to provide a discrete source of compressed gaseous fluid for each of two or more nozzles. If desired, the perforating apparatus of FIG. 3 can be equipped with a full annulus of nozzles (or with a single circumferentially complete or interrupted annular nozzle) whose orifices direct streams or jets of compressed gas against different sections of the rim 51.

As shown in FIG. 6 of the aforementioned U.S. Pat. No. 4,281,670 to Heitmann et al., the apparatus of FIG. 3 can be modified by using additional mirrors in order to furnish beams of coherent radiation to two discrete perforating units which provide each wrapper W with two annuli of perforations. Such mode of constructing the perforating apparatus is particularly desirable when the perforations are made in the wrappers of filter plugs forming part of filter cigarettes of double unit length. Upon subdivision of each such cigarette into a pair of filter cigarettes of unit length, the wrapper of the filter plug of each discrete filter cigarette of unit length is formed with at least one annulus of perforations.

A further embodiment of the perforating apparatus is shown in FIG. 4 wherein a running web 56 of cigarette paper, imitation cork or a like material is caused to advance through the gaps between pairs of electrodes 58, 58' having opposite polarities. The direction in which the web 56 is transported is indicated by the arrow 156. A somewhat similar electroperforating apparatus is disclosed in commonly owned U.S. Pat. No.

4,247,754 granted Jan. 27, 1981 to Anton Baier for "Apparatus for perforating webs of wrapping material for rod-shaped smokers' products". The disclosure of this patent is incorporated herein by reference. Attention is further invited to commonly owned copending application Ser. No. 179,687 filed Aug. 20, 1980 by Peter Pinck et al. for "Method and apparatus for treatment of wrapping material for cigarettes or the like" and to the corresponding German Offenlegungsschrift No. P 29 34 044.

The electroperforating apparatus of FIG. 4 comprises a composite frame or carrier 54 which supports electrical insulators 57, 57a disposed at the opposite sides of the path for the running web 56 and respectively supporting the electrodes and 58'. The illustrated electrodes 58' are connected to each other at 158'. The right-hand electrode 58 is connected with the next-following electrode 58 (not shown in FIG. 4) by a connector 158. An electrode 59 is connected to a source 159 of high potential and is further connected with the left-hand electrode 58. Those end portions of the electrodes 58 and 58' which are adjacent to the path of movement of the web 56 extend into grooves or recesses 61, 61a which constitute elongated channels extending in the longitudinal direction of the running web 56. An electrode corresponding to that shown at is provided in the insulator 57a to connect the electrodes 58' with an energy source.

In accordance with a feature of the invention, the apparatus comprises a source 64 of compressed gaseous fluid (e.g., air or a protecting gas) which is in communication with a channel 62 in the frame 54. Bores 63 and 63a connect the channel 62 with the respective channels 61, 61a so that streams of compressed gas flow along both sides of the running web 56 when the apparatus of FIG. 4 is in use. The insulators 57 and 57a are respectively formed with channels or bores 66 and 66a which also communicate with the channels 62 to admit streams or jets 55 of compressed gas into the respective orifices 67 and 67a of the insulators 57 and 57a. Such jets are caused to impinge upon the rims 65 of the exposed portions of the electrodes 58 and 58', namely, on the marginal portions of end faces or tips 60 of the pairs of electrodes 58 and 58' to prevent the accumulation of solid combustion products in such regions. The manner in which energy (sparks across the gaps between the pairs of electrodes 58 and 58') is caused to perforate the running web 56 is fully disclosed in the aforementioned patent to Baier and in the aforementioned copending application Ser. No. 179,687 of Peter Pinck et al.

It will be noted that the orifices 67 and 67a direct jets 55 of compressed gas against the downstream sections of the exposed marginal portions or rims 65 of the electrodes 58 and 58', namely, upon those sections which face in the direction of arrow 156. The jets 55 issuing from the orifices 67 and 67a prevent rapid and excessive accumulations of solid combustion products on the exposed portions of the electrodes 58 and 58', especially on those portions of the electrodes whereon such accumulations would be likely to interfere with the making of perforations having a predictable size and/or shape. The solid combustion products which develop during the making of perforations in the running web 56 are evacuated by the streams of gaseous fluid which flow in the channels or grooves 61 and 61a. Such streams can be caused to pass through suitable filters, not shown, which intercept the combustion products to thus prevent contamination of the surrounding atmosphere.

The electrodes 58 and 58' can be said to constitute perforating units which direct electrical energy across the respective gaps G in order to ensure the making of perforations in the running web 56. The energy is in the form of sparks which jump across the respective gaps G when the electroperforating apparatus of FIG. 4 is in actual use. The electrode 59 can be said to constitute an element of the source 159 of high potential which is applied to the electrodes 58 to generate sparks across the gaps G. The making of orifices 67 and 67a directly in the electrical insulators 57 and 57a simplifies the construction of the electroperforating apparatus and contributes to lower initial and maintenance cost.

All embodiments of the improved perforating apparatus share the advantage that solid products of combustion cannot settle in regions where they could interfere with the making of predictable perforations. This applies irrespective of whether the perforating units are designed to direct beams of coherent radiation or sparks across the gaps between pairs of associated or cooperating perforating units (electrodes 58, 58'). It has been found that the improved apparatus are invariably capable of preventing excessive agglomerations of solid combustion products during extended periods of use and irrespective of the nature of material which is used for the making of webs 1, wrappers W and/or webs 56. Manufacturers of cigarettes or analogous rod-shaped smokers' products invariably demand adherence to a predetermined permeability of the wrappers of filter cigarettes, cigars or cigarillos so that the improved apparatus brings about a highly satisfactory solution of problems which arise in connection with the use of heretofore known perforating apparatus in modern high-speed cigarette making or analogous machines wherein relatively short interruptions of operation (e.g., for the inspection and or cleaning of perforating apparatus) could entail extremely high losses in output.

Another important advantage of the improved perforating apparatus is its versatility, i.e., the apparatus can be used for the making of holes or perforations in a continuously running web (1 or 56) of cigarette paper, imitation cork or the like, as well as for the making of one or more annuli of perforations in the wrapper of each of a long series of rapidly advancing rod-shaped smokers' products, such as filter cigarettes or the like. Moreover, the apparatus not only prevents the gathering of solid combustion products on exposed portions of the perforating units but also the accumulation of such products in the general area of the perforating station or stations. Thus, the apparatus can be equipped with simple and reliable means for removing floating solid combustion products from the spaces or chambers at both sides of a running web (1 or 56) as well as from the gaps (G) between the electrodes or analogous perforating units of an electroperforating apparatus. This also contributes to a reduction of frequency and duration of down times because the solid combustion products are even less likely to contaminate the apparatus and/or the machine in which the apparatus is installed, even after long or very long periods of continuous use.

Protective gas is preferred in many types of perforating apparatus, especially when the nature of the material to be perforated is such that it is likely to begin to glow or to burn at temperatures which prevail at the perforating station or stations. Thus, the protective gas can be selected with a view to reduce the likelihood of combustion of the web 1 or 56 and/or of the wrappers W. Such protective gas is further desirable when the material of the web 1 or 56 or the material of the wrappers W exhibits the tendency to char around the perforations and to thus adversely affect the appearance of smokers' products which embody portions of such material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for perforating sheet-like material, particularly a moving wrapping material for rod-shaped articles of the tobacco processing industry, comprising a source of coherent radiation; at least one energy-directing perforating unit which is spaced apart from the material to be perforated and has a marginal portion beyond which radiant energy which is used to make perforations and is supplied by said source propagates itself against the material with attendant separation of solid matter in the regions of impingement of radiant energy upon the material, said marginal portion having an end face and a rim surrounding said end face and said perforating unit having a passage for the propagation of radiant energy against the material to be perforated, said passage having an outlet and said rim surrounding said outlet; means for transporting the material during impingement of radiant energy thereon; a source of pressurized gaseous fluid; and means for conveying at least one stream of gaseous fluid which is supplied by the respective source against the exterior of said portion of said perforating unit to thus reduce the likelihood of accumulation of solid matter thereon, said conveying means comprising at least one nozzle receiving fluid from the respective source and arranged to direct such fluid against at least a part of said rim.

2. The apparatus of claim 1, wherein said transporting means comprises means for advancing the material to be perforated in a predetermined direction, said portion of said perforating unit including a section facing in said direction and said conveying means being arranged to direct said stream against said section of said portion of said perforating unit.

3. The apparatus of claim 2, wherein said conveying means includes means for directing at least one additional stream of gaseous fluid against another section of said portion of said perforating unit.

4. The apparatus of claim 1, further comprising a carrier for said perforating unit, said carrier, having a surface facing the material to be perforated and said portion of said perforating unit extending beyond said surface of said carrier.

5. The apparatus of claim 4, wherein said nozzle is supported by said carrier and is arranged to direct gaseous fluid gainst said part of said rim.

6. The apparatus of claim 4, wherein, said conveying means further comprises means for feeding gaseous fluid from said source to said nozzle.

7. The apparatus of claim 1, a carrier for said perforating unit, said carrier and the material to be perforated defining a chamber which is traversed by the energy propagating itself beyond said portion of said unit, and means for circulating a gaseous fluid in said chamber so as to remove solid matter therefrom.

8. The apparatus of claim 7, wherein said transporting means comprises means for advancing the material to be perforated in a predetermined direction, said circulating means including means for conveying a stream of gaseous fluid substantially transversely of the direction of advancement of said material.

9. The apparatus of claim 1, further comprising a carrier for said perforating unit, said transporting means including means for advancing the material to be perforated in a predetermined direction and further comprising guide means defining for the material a predetermined path along which the material advances past said perforating unit, said guide means and said carrier defining a chamber which is traversed by the radiant energy propagating itself beyond said portion of said unit and toward said path, and further comprising means for circulating a gaseous fluid in said chamber so as to remove solid matter therefrom.

10. The apparatus of claim 1, wherein said perforating unit comprises a tubular housing including said portion and having an inlet for radiant energy, said passage extending between said inlet and said outlet.

11. The apparatus of claim 10, wherein said perforating unit further includes an optical element in said passage, and further comprising means for directing a beam of radiant energy from the respective source against said optical element, said optical element being positioned and arranged to focus the radiant energy upon the material to be perforated.

12. The apparatus of claim 11, further comprising means for admitting pressurized gaseous fluid into said passage so that the pressurized fluid cools said housing.

13. The apparatus of claim 11, further comprising carrier means for said perforating unit and at least one additional perforating unit installed in said carrier means, said portions of said perforating units extending from said carrier means toward the material to be perforated.

14. The apparatus of claim 13, further comprising means for splitting said beam so that each of said perforating units receives a share of radiant energy which is supplied by the respective source.

15. The apparatus of claim 14, wherein said carrier means has tunnel means for admitting radial energy to the inlets of housings forming part of said perforating units and said beam splitting means includes optical means installed in said tunnel means.

16. The apparatus of claim 1, wherein said transporting means comprises means for advancing the material to be perforated along a predetermined path and further comprising at least one additional perforating unit, said units being arranged to make discrete rows of perforations in the material moving along said path.

17. The apparatus of claim 1, wherein the material constitutes a continuous web advancing along a predetermined path and further comprising guide means defining said path, said guide means including at least one component adjacent to that location where the energy issuing from said perforating unit impinges upon the web.

18. The apparatus of claim 17, wherein said path is an arcuate path and said component of said guide means extends substantially transversely of the direction of advancement of the web along said path.

19. The apparatus of claim 18, wherein said component includes a guide pin.

20. The apparatus of claim 19, wherein said guide pin is at least substantially normal to the longitudinal direction of the web.

21. The apparatus of claim 18, wherein said path has a convex side facing said perforating unit.

22. The apparatus of claim 17, wherein said path is disposed between said guide means and said perforating unit.

23. The apparatus of claim 1, further comprising means for circulating a gaseous fluid along that side of the material to be perforated which faces away from said perforating unit.

24. The apparatus of claim 23, wherein said tranporting means comprises means for advancing the material along a predetermined path which is spaced apart from said portion of said perforating unit and further comprising cover means defining with the material in said path a chamber wherein said circulating means is operative to convey a stream of gaseous fluid substantially transversely of the direction of advancement of the material along said path.

25. The apparatus of claim 1, wherein the material to be perforated is a tubular wrapper for a rod-shaped article, and further comprising means for rotating such wrapper around its axis during impingement of energy thereagainst.

26. The apparatus of claim 1, wherein said perforating unit and said conveying means are installed in a filter tipping machine, said machine having material advancing means which forms part of said transporting means.

* * * * *